(12) United States Patent
Gao et al.

(10) Patent No.: US 12,532,030 B2
(45) Date of Patent: Jan. 20, 2026

(54) SYSTEMS AND METHODS FOR WEDGE-BASED PREDICTION MODE SIGNALING

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 46 days.

(21) Appl. No.: 18/143,522

(22) Filed: May 4, 2023

(65) Prior Publication Data

US 2024/0205459 A1    Jun. 20, 2024

Related U.S. Application Data

(60) Provisional application No. 63/432,686, filed on Dec. 14, 2022.

(51) Int. Cl.
*H04N 19/70* (2014.01)
*H04N 19/119* (2014.01)
(Continued)

(52) U.S. Cl.
CPC ........... *H04N 19/70* (2014.11); *H04N 19/119* (2014.11); *H04N 19/13* (2014.11); *H04N 19/157* (2014.11);
(Continued)

(58) Field of Classification Search
CPC ...... H04N 19/70; H04N 19/119; H04N 19/13; H04N 19/157; H04N 19/176; H04N 19/1887; H04N 19/50
See application file for complete search history.

(56) References Cited

U.S. PATENT DOCUMENTS

2019/0289319 A1    9/2019  Mukherjee et al.
2021/0195245 A1*   6/2021  Li ........................ H04N 19/176
(Continued)

FOREIGN PATENT DOCUMENTS

CN           113709499 A   * 11/2021   ........... H04N 19/103

OTHER PUBLICATIONS

Farouk (An efficient hardware solution for 3D-HEVC intra-prediction—J Real-Time Image Proc (2019) 16:1559-1571 DOI 10.1007/s11554-016-0664-1)—/ Accepted: Dec. 21, 2016 / Published online: Jan. 3, 2017 (Year: 2017).*

(Continued)

*Primary Examiner* — Nasim N Nirjhar
(74) *Attorney, Agent, or Firm* — Morgan, Lewis & Bockius LLP

(57) ABSTRACT

The various embodiments described herein include methods and systems for encoding and decoding video. In one aspect, a method includes receiving video data comprising a plurality of blocks, including a first block. The method also includes obtaining, from the video data, a syntax element value indicating a wedge mode index corresponding to a first partition mode from a plurality of partition modes for the first block, where the wedge mode index is greater than 16. The method further includes determining that the first partition mode is associated with a compound wedge-based prediction for the first block. The method also includes partitioning the first block into a first section and a second section in accordance with the first partition mode and the wedge mode index, and decoding the first section in accordance with a first predictor and decoding the second section in accordance with a second predictor.

19 Claims, 9 Drawing Sheets

(51) Int. Cl.
*H04N 19/13* (2014.01)
*H04N 19/157* (2014.01)
*H04N 19/169* (2014.01)
*H04N 19/176* (2014.01)
*H04N 19/50* (2014.01)

(52) U.S. Cl.
CPC ....... *H04N 19/176* (2014.11); *H04N 19/1887* (2014.11); *H04N 19/50* (2014.11)

(56) References Cited

U.S. PATENT DOCUMENTS

| | | |
|---|---|---|
| 2022/0303533 A1 | 9/2022 | Deng et al. |
| 2022/0337844 A1* | 10/2022 | Deng .................. H04N 19/157 |
| 2022/0360789 A1* | 11/2022 | Hsiao .................. H04N 19/119 |

OTHER PUBLICATIONS

Tencent Technology, ISRWO, PCT/US2023/021215, Aug. 4, 2023, 10 pgs.

* cited by examiner

SYSTEMS AND METHODS FOR WEDGE-BASED PREDICTION MODE SIGNALING

CROSS-REFERENCE TO RELATED APPLICATION

This application claims priority to U.S. Provisional Patent Application No. 63/432,686, entitled "Wedge-Based Prediction Mode Signaling Improvement" filed Dec. 14, 2022, which is hereby incorporated by reference in its entirety.

TECHNICAL FIELD

The disclosed embodiments relate generally to video encoding and decoding, including but not limited to systems and methods for block partitioning and signaling.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

The present disclosure describes various techniques that can be used by a decoder of video bitstreams to improve the quality and/or efficiency of the decoding. A video encoder may also implement these techniques during encoding (e.g., to reconstruct encoded frames and/or test hypotheses).

During a video coding process, video data is separated into blocks. In the present disclosure, the term "block" may be interpreted as a prediction block, a coding block, or a coding unit (CU), as described in greater detail later. Geometrically partitioning the blocks takes into account the two-dimensional geometry of video objects. After partitioning, a different motion predictor can be used for each section of the block. For lossy compression, this partitioning approach improves quality (accuracy) of encoding/decoding for more complicated objects.

In accordance with some embodiments, a method of video encoding is provided. The method includes: (i) obtaining video data comprising a plurality of blocks, including a first block; (ii) identifying a first partition mode from a plurality of partition modes for the first block; (iii) partitioning the first block into a first section and a second section in accordance with the first partition mode; (iv) encoding the first section in accordance with a first predictor and encoding the second section in accordance with a second predictor; and (v) signaling the first partition mode.

In accordance with some embodiments, a method of video decoding is provided. The method includes: (i) obtaining video data comprising a plurality of blocks, including a first block, from a bitstream; (ii) identifying a first partition mode from a plurality of partition modes for the first block; (iii) partitioning the first block into a first section and a second section in accordance with the first partition mode; and (iv) reconstructing the first block, including reconstructing the first section using a first predictor and reconstructing the second section using a second predictor.

In accordance with some embodiments, a method of video decoding performed at a computing system having memory and one or more processors. The method includes: (i) receiving video data comprising a plurality of blocks, including a first block; (ii) obtaining, from the video data, a syntax element value indicating a wedge mode index corresponding to a first partition mode from a plurality of partition modes for the first block, where the wedge mode index is greater than 16; (iii) determining that the first partition mode is associated with a compound wedge-based prediction for the first block; (iv) partitioning the first block into a first section and a second section in accordance with the first partition mode and the wedge mode index; and (v) decoding the first section in accordance with a first predictor and decoding the second section in accordance with a second predictor.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding/decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

Figure 1:
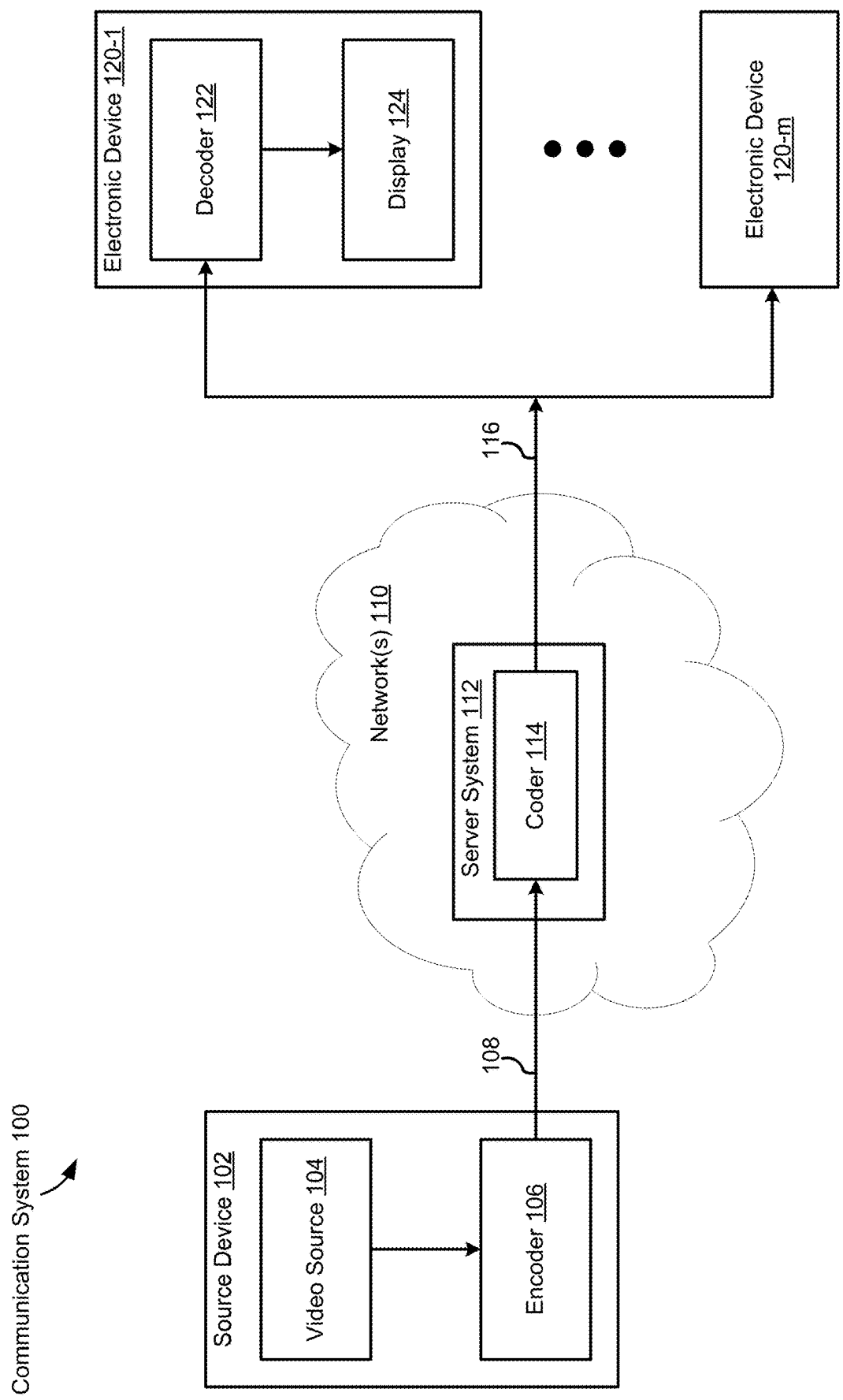
FIG. 1 is a block diagram illustrating an example communication system in accordance with some embodiments.

The present disclosure describes, among other things, using various partitioning techniques for partitioning video blocks for more optimal motion prediction and higher quality encoding. For example, existing partitioning modes may be sub-optimal for more complicated video objects. In these cases, more accurate partitioning modes can better represent the shape of the video object and therefore can improve the accuracy of the motion predictions and thus the quality/accuracy of the video encoding and decoding.
Example Systems and Devices FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
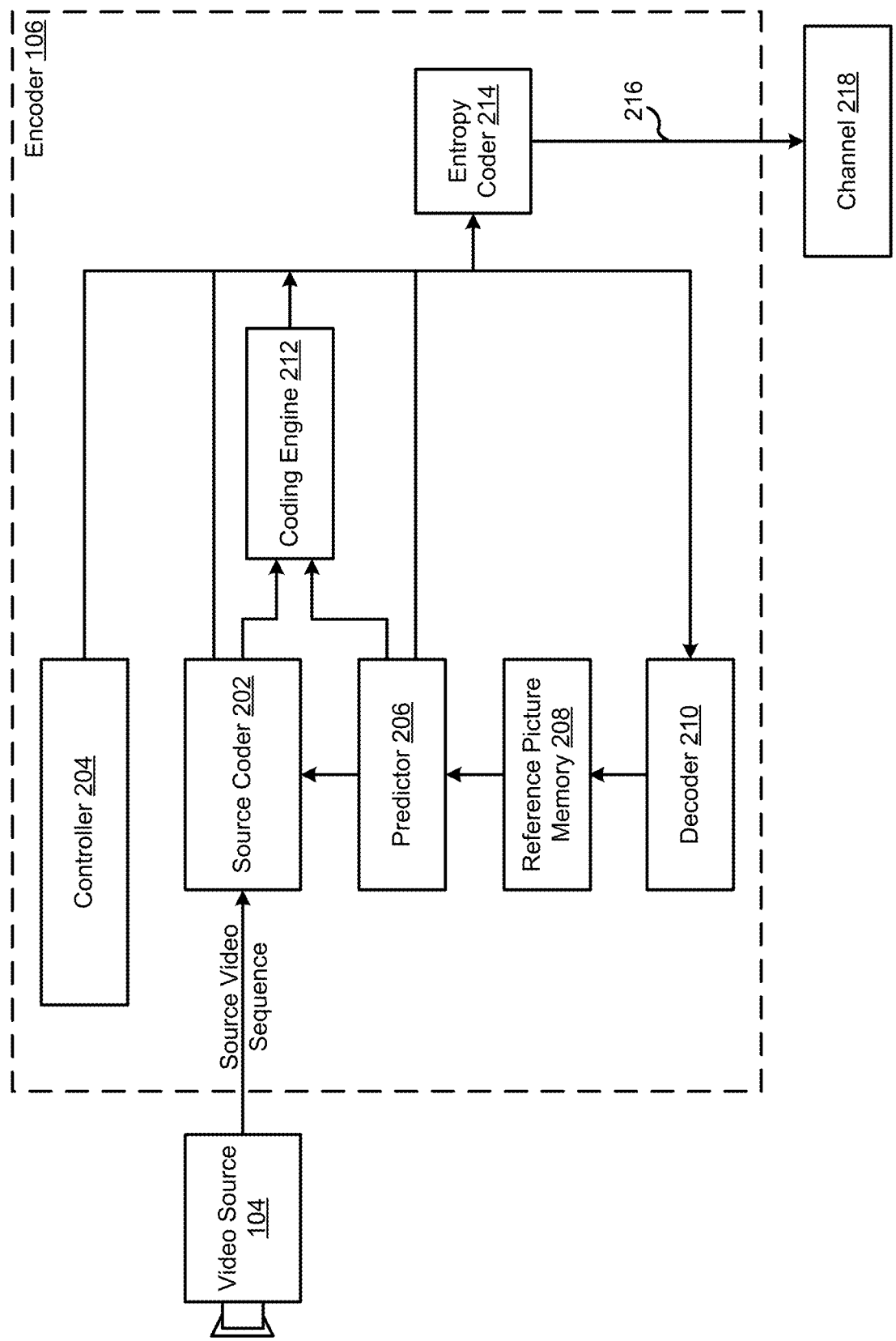
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
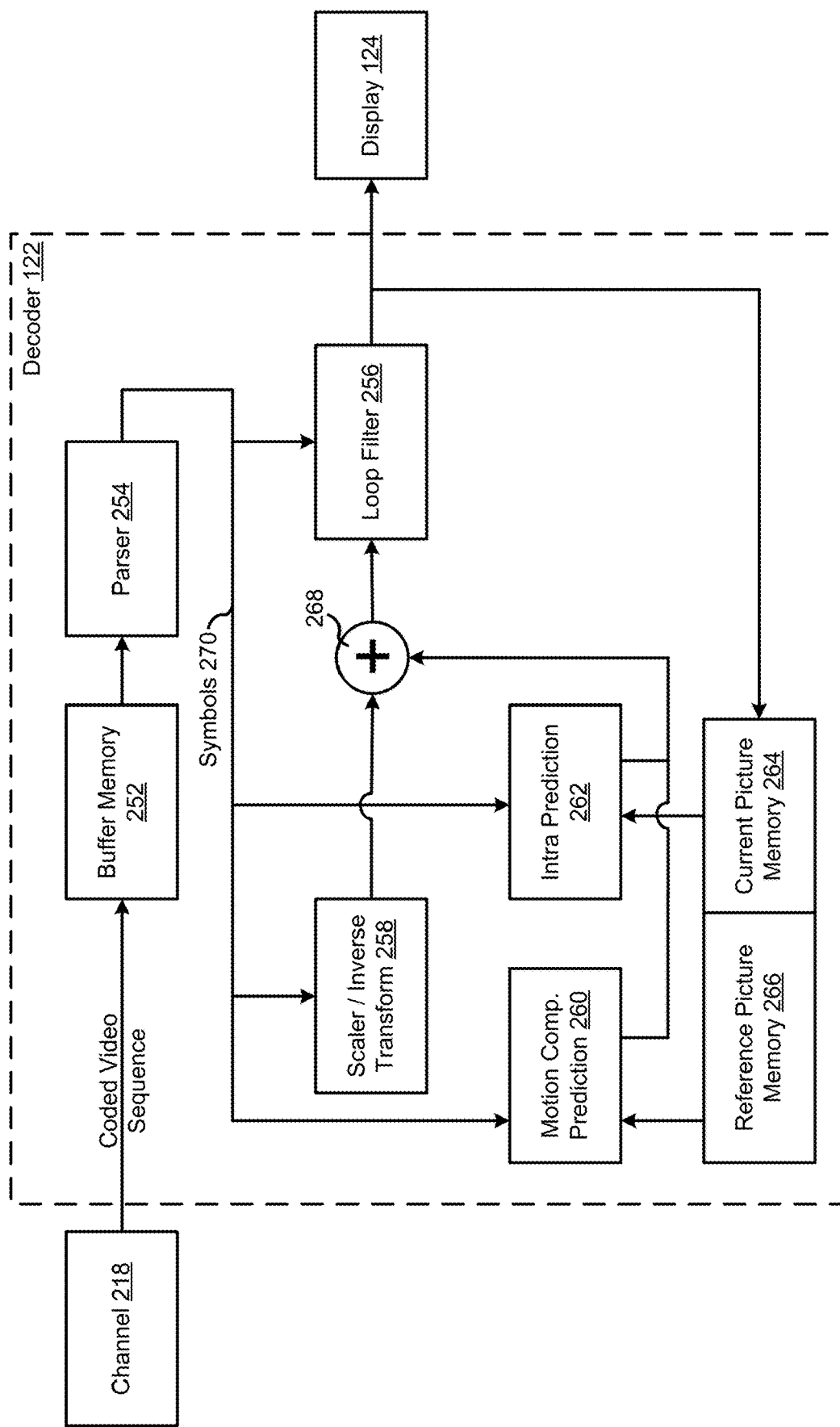
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
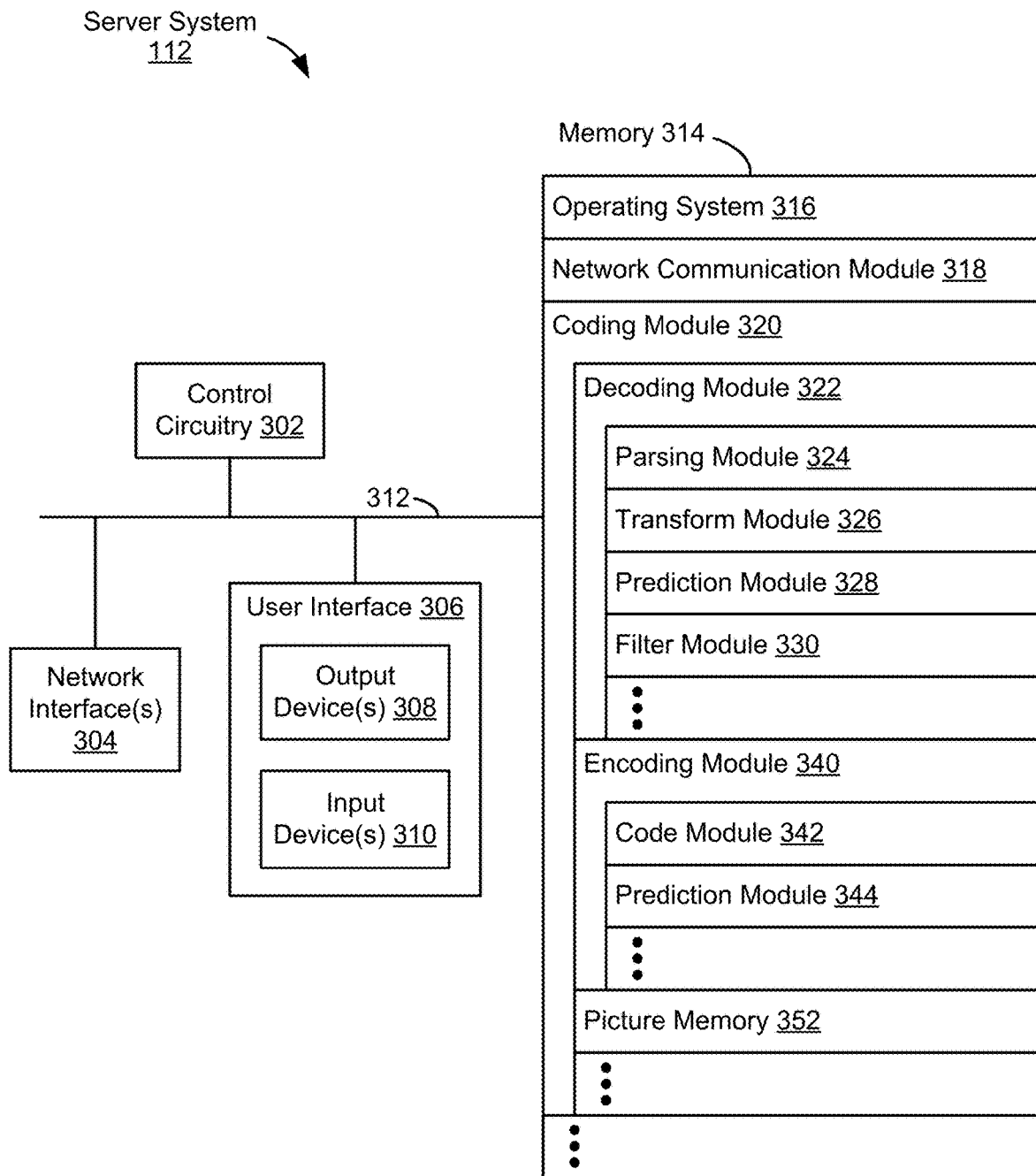
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:
- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

Figure 4C:
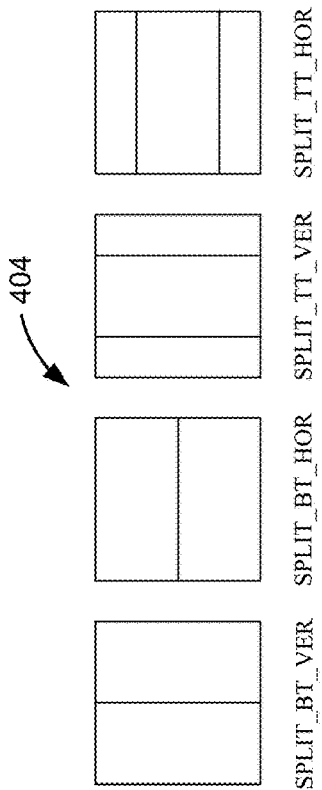
FIGS. 4A-4D illustrate example coding tree structures in accordance with some embodiments.
Figure 4D:
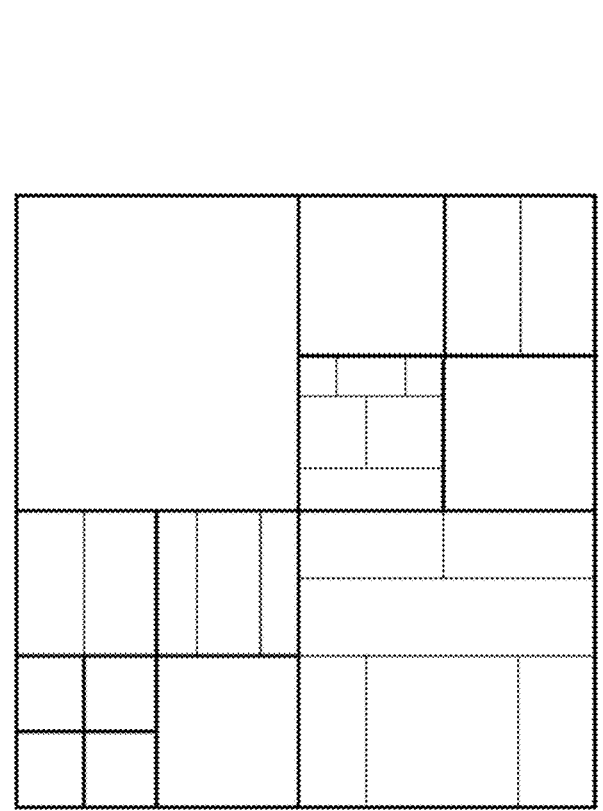
Figure 4A:
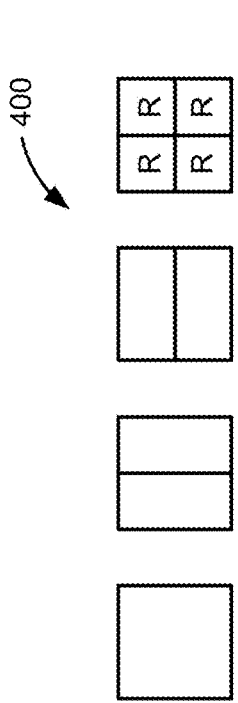

FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

Figure 4B:
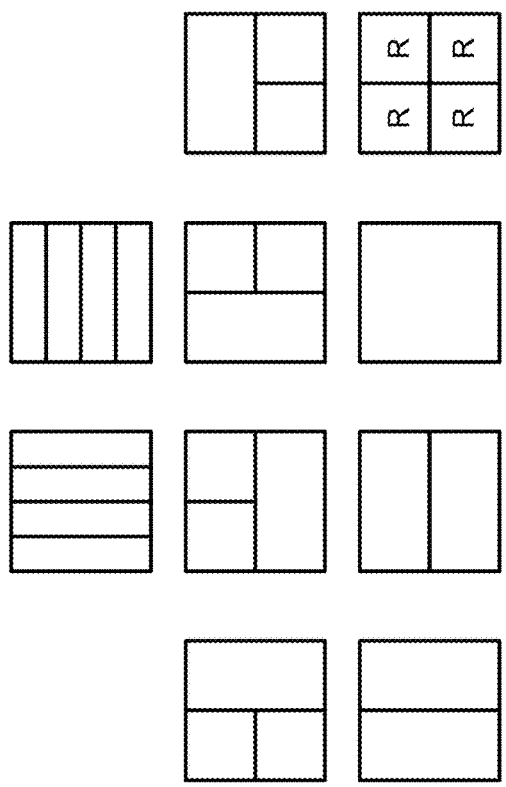

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B is referred to as a T-type partition. The rectangular partitions in this tree structure cannot be further subdivided. In addition to a coding block size, coding tree depth can be defined to indicate the splitting depth from the root note. For example, the coding tree depth for the root node, e.g., 128×128, is set to 0, and after a tree block is further split once, the coding tree depth is increased by 1.

As an example, instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 are supported. For chroma blocks, only the largest possible transform units are allowed.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU. One of the key features of the HEVC structure is that it has multiple partition concepts including CU, PU, and TU. In HEVC, a CU or a TU can only be a square shape, while a PU may be a square or rectangular shape for an inter predicted block. In HEVC, one coding block may be further split into four square sub-blocks, and a transform is performed on each sub-block (TU). Each TU can be further split recursively (using quad-tree split) into smaller TUs, which is called Residual Quad-Tree (RQT). At a picture boundary, such as in HEVC, implicit quad-tree split may be employed so that a block will keep quad-tree splitting until the size fits the picture boundary.

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. ACTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. For example, the multi-type tree structure includes vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An exception occurs when a maximum supported transform length is smaller than the width or height of the color component of the CU. An example of block partitions for one CTU (406) is shown in FIG. 4D, which illustrates an example quadtree with nested multi-type tree coding block structure.

A maximum supported luma transform size may be 64×64 and the maximum supported chroma transform size may be 32×32, such as in VVC. When the width or height of the CB is larger than the maximum transform width or height, the CB is automatically split in the horizontal and/or vertical direction to meet the transform size restriction in that direction.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

In order to support the extended coding block partitions, multiple transform sizes (e.g., ranging from 4-point to 64-point for each dimension) and transform shapes (e.g., square or rectangular with width/height ratio's 2:1/1:2 and 4:1/1:4) may be utilized, such as in AV1.

Motion estimation involves determining motion vectors that describe the transformation from one image (picture) to another. The reference image (or block) can be from an adjacent frame in a video sequence. The motion vectors may relate to the whole image (global motion estimation) or a particular block. Additionally, the motion vectors can correspond to a translational model or warped model that approximate the motion (e.g., rotation and translation in three dimensions and zoom). Motion estimated can be improved in some circumstances (e.g., with more complicated video objects) by further partitioning the blocks.

A geometric partitioning mode (GPM) may focus on inter-picture predicted CUs. When GPM is applied to a CU, the CU is split into two parts via a straight partitioning boundary. The location of the partitioning boundary may be mathematically defined by an angle parameter φ and an offset parameter ρ. These parameters may be quantized and combined into a GPM partitioning index lookup table. The GPM partitioning index of the current CU may be coded into the bitstream. For example, 64 partitioning modes are supported by GPM in VVC for a CU with a size of w×h=2k×2l (in terms of luma samples) with k, l ∈ {3 ... 6}. GPM may be disabled on a CU that has an aspect ratio larger than 4:1 or smaller than 1:4, e.g., because narrow CUs rarely contain geometrically separated patterns.

After partitioning, the two GPM sections (partitions) contain individual motion information that can be used to predict the corresponding sections in the current CU. In some embodiments, only a unidirectional motion-compensated prediction (MCP) is allowed for each section of the GPM so that the required memory bandwidth for MCP in the GPM is equal to that for the regular bidirectional MCP. To simplify the motion information coding and reduce the possible combinations for the GPM, the motion information can be coded with merge mode. The GPM merge candidate list can be derived from the conventional merge candidate list, to ensure that only unidirectional motion information is contained.

Figure 5A:
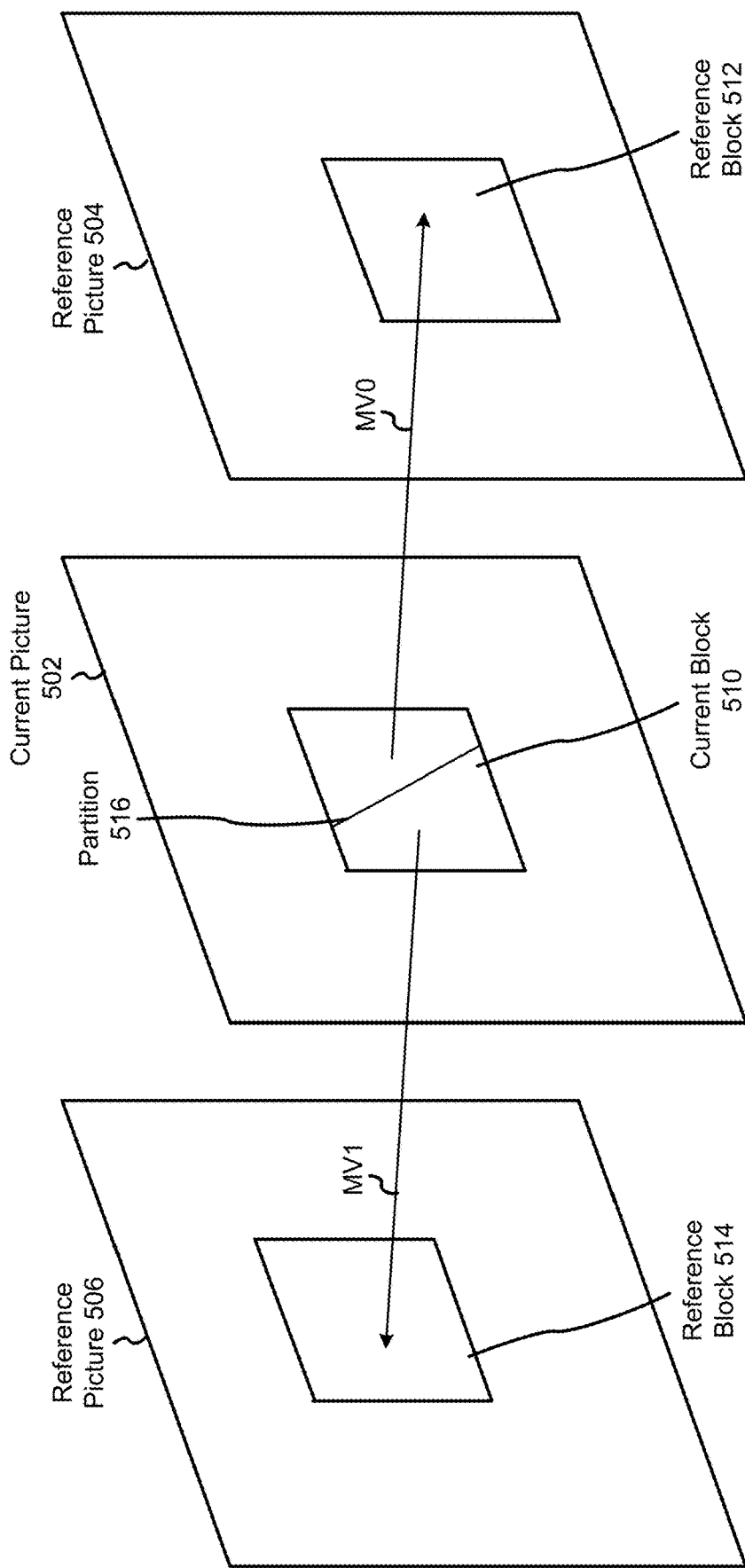
FIG. 5A shows an example of a geometric partitioning mode prediction in accordance with some embodiments.

FIG. 5A illustrates a prediction process of GPM in accordance with some embodiments. A current block 510 is partitioned into a right-side section and a left-side section via a partition 516. The right-side predicted part of the current block 510 (e.g., CU) of current picture 502 (e.g., with a size of w×h) is predicted by MV0 from reference block 512 of reference picture 504, whereas the left-side part is predicted by MV1 from reference block 514 of reference picture 506.

Figure 5B:
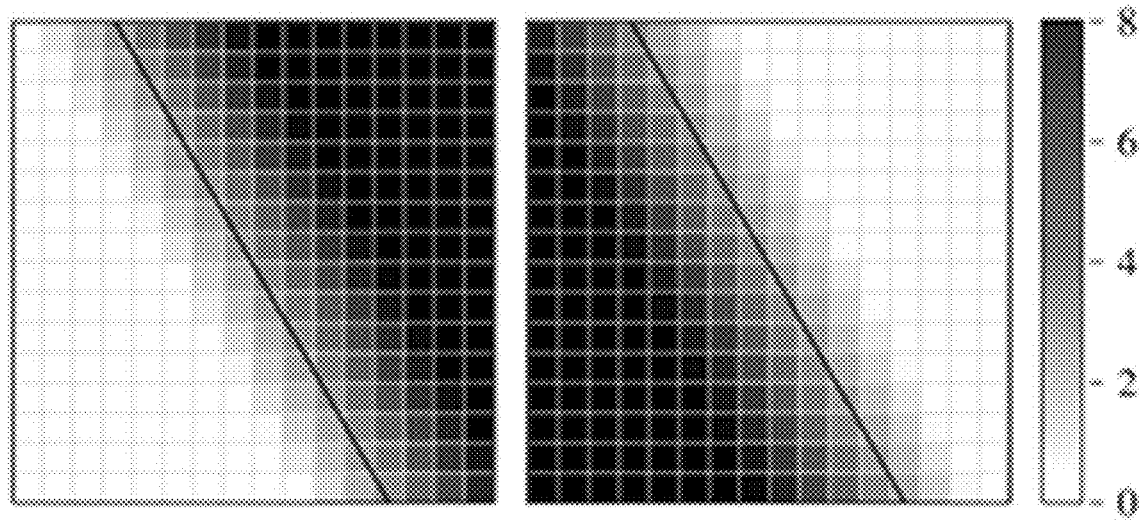
FIGS. 5B-5C show example partitioning mode blendings in accordance with some embodiments.

FIG. 5B illustrates example blending matrices for a partition (e.g., the partition 516) in accordance with some embodiments. In this example, a final GPM prediction (PG) is generated by performing a blending process using integer blending matrices W0 and W1, e.g., containing weights in the value range of 0 to 8. This can be expressed as:

Blended Prediction $$PG = (W0 \circ P0 + W1 \circ P1 + 4) >> 3 \quad \text{Equation 1}$$

$$\text{with } W0 + W1 = 8J$$

In Equation 1, J is a matrix of ones with a size of w×h. The weights of the blending matrix may depend on the displacement between the sample location and the partitioning boundary. The computational complexity of blending matrices derivation can be extremely low, so that these matrices can be generated on-the-fly at the decoder side.

The generated GPM prediction (PG) can then be subtracted from the original signal to generate the residuals. The residuals are transformed, quantized, and coded into the bitstream, e.g., using the regular VVC transformation, quantization, and entropy coding engines. At the decoder side, the signal is reconstructed by adding the residuals to the GPM prediction PG. A skip mode can also be supported by GPM, e.g., when the residuals are negligible. For example, the residual is dropped by the encoder, and the GPM prediction PG is directly used by the decoder as the reconstructed signal.

Figure 5C:
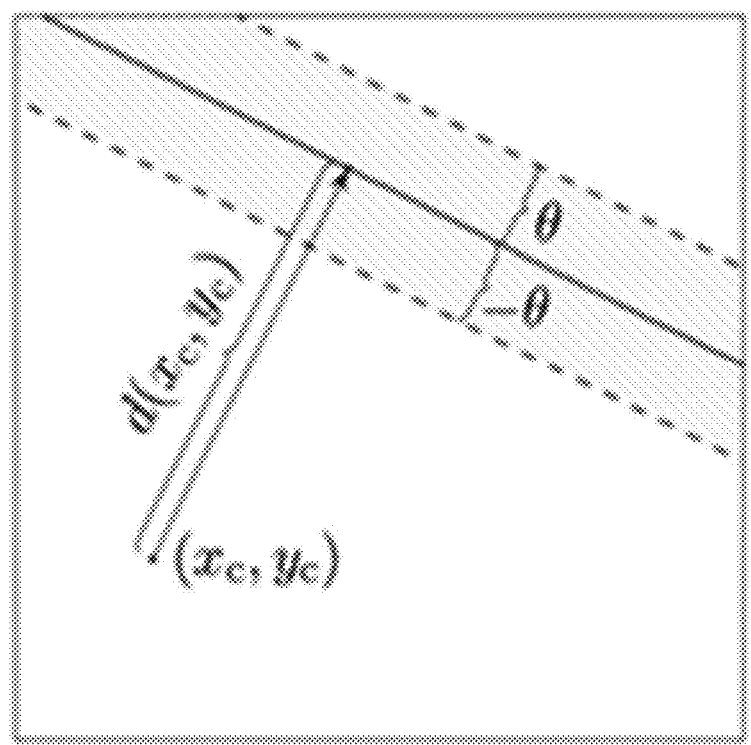

The GPM can be further enhanced, e.g., by GPM+TM, GPM+MMVD, and Inter+Intra GPM. As shown in FIG. 5C, the blending strength or blending area width θ may be fixed for all different contents. In some embodiments, the weighing values in the blending mask is given by a ramp function:

Blending Ramp Function $$\omega_{x_c,y_c} = \begin{cases} 0 & d(x_c, y_c) \leq -\theta \\ \frac{8}{2\theta}(d(x_c, y_c) + \theta) & -\theta < d(x_c, y_c) < \theta, \\ 8 & d(x_c, y_c) \geq \theta \end{cases} \quad \text{Equation 2}$$

For example, with a fixed θ=2. This ramp function can be quantized as:

Quantized Ramp Function $$\omega_{m,n} = Clip3(0, 8, (d(m, n) + 32 + 4) >> 3) \quad \text{Equation 3}$$

Such a design may be not always optimal because the fixed blending area width cannot always provide the best blending quality for various types of video contents. For example, video contents usually contain strong textures and sharp edges, which requires a narrow blending area to preserve the edge information. For camera-captured content, blending is generally required; but the blending area width may be dependent on a number of factors, e.g., the actual boundaries of the moving objects and the motion distinctiveness of two partitions.

To address this issue, an adaptive blending scheme can be used for the GPM, which dynamically adjusts the width of the blending area surround the GPM partition boundary. For example, the width of the blending area (θ) can be selected from a set of predefined values {0, 1, 2, 4, 8}. The optimal blending area width can be determined for each GPM CU at the encoder and signaled to the decoder based on a syntax element, merge_gpm_blending_width_idx. For example, all predefined blending strength values can be shiftable while all the clipping and shifting operations in the GPM blending process can be kept without any changes.

In addition, the range of the weights can be increased from [0, 8] to [0, 32] to accommodate the increased width of the GPM blending area. Specifically, the weights can be calculated as:

Increased Quantized Ramp Function $$\omega_{x_c, y_c} = \begin{cases} Clip3(0, 32, (d(m, n) + 16\theta + (\theta >> 1)) >> \log_2 \theta) & \theta \neq 0 \\ (d(m, n) > 0 ? 32 : 0) & \theta = 0 \end{cases}$$

Equation 4

Figure 5D:
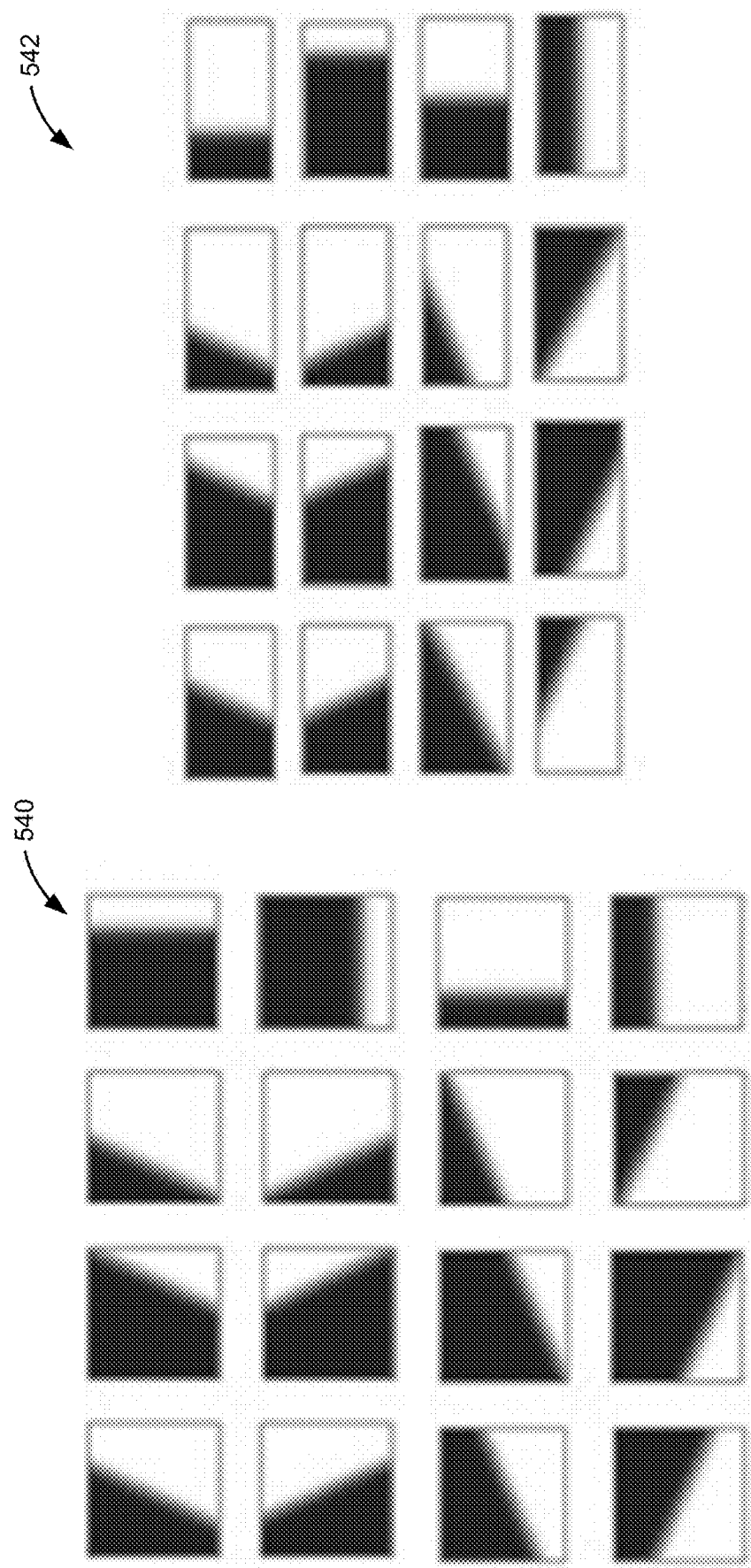
FIG. 5D shows example wedge-based partitioning in accordance with some embodiments.

Wedge-based prediction is a compound prediction mode (e.g., in AV1), which is similar to GPM. The wedge-based prediction can be used for both inter-inter and inter-intra combinations. Boundaries of moving objects are often difficult approximate by on-grid block partitions. A solution is to predefine a codebook of 16 possible wedge partitions and to signal the wedge index in the bitstream when a coding unit chooses to be further partitioned in such a way. The 16-ary shape codebooks containing partition orientations that are either horizontal, vertical, or oblique (e.g., with slopes ±2 or ±0.5) are designed for both square blocks 540 and rectangular blocks 542 as shown in FIG. 5D. To mitigate spurious high-frequency components, which often are produced by directly juxtaposing two predictors, soft-cliff-shaped 2-D wedge masks can be employed to smooth the edges around the intended partition (e.g., m(i,j) is close to 0.5 around the edges and gradually transforms into binary weights at either end).

In the current wedge design in AV1 and AVM, 16 modes are supported because a maximum 16 symbols can be signaled in one syntax element with the multi-symbol adaptive context coding used in AV1 and AVM. Extending the number of modes in wedge could further increase the coding performance.

Figure 6A:
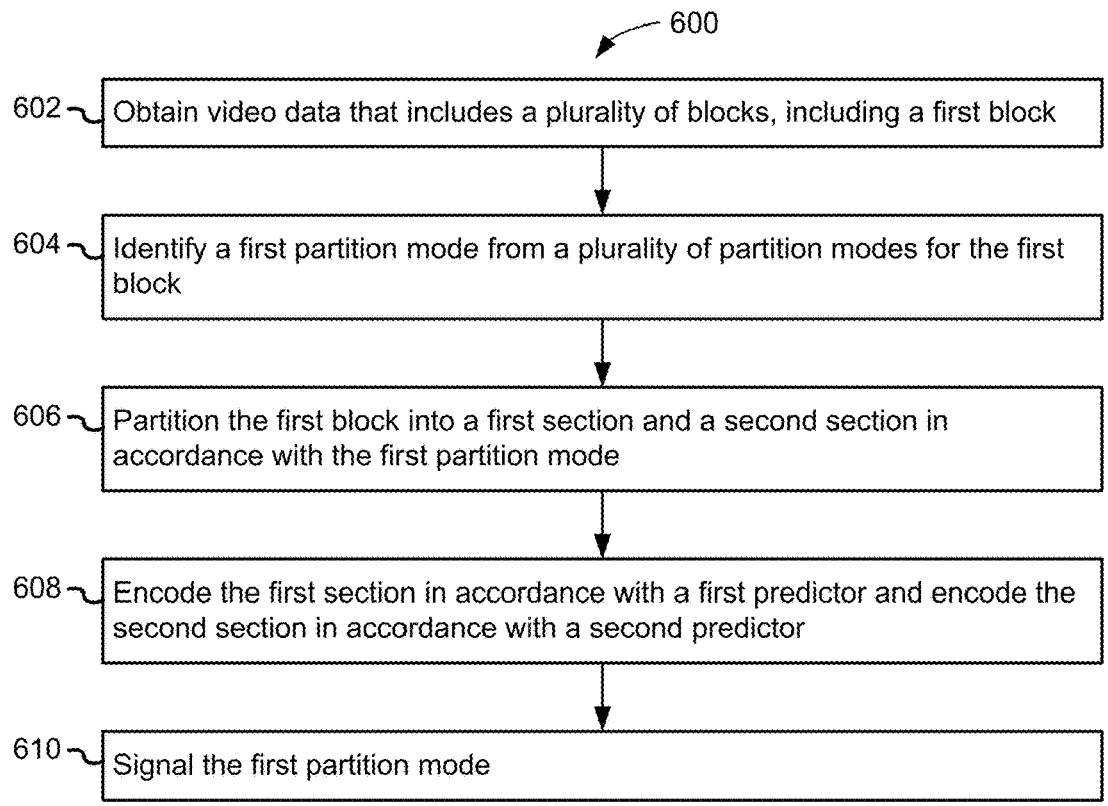
FIG. 6A is a flow diagram illustrating an example method of encoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system obtains (602) video data that includes a plurality of blocks, including a first block. The system identifies (604) a first partition mode from a plurality of partition modes for the first block. The system partitions (606) the first block into a first section and a second section in accordance with the first partition mode. The system encodes (608) the first section in accordance with a first predictor and encode the second section in accordance with a second predictor. The system signals (610) the first partition mode.

In some embodiments, the plurality of partition modes includes a number of wedge modes. In some embodiments, the number of wedge modes is not limited to 16. In some embodiments, the number of wedge modes is 68.

In some embodiments, the wedge mode index is signaled using binary codeword. As an example, the wedge index is binarized using truncated binary code, e.g., the modes with low frequency are assigned more bins, and the modes with high frequency are assigned less bins. In this example, each bin can be only zero or one values and coded with current adaptive context-based coding or simple context bypass coding. The frequency of the wedge modes can be predefined or derived based on the decoder (or coded) side information.

In some embodiments, the wedge index is binarized using Exp-Golomb code. In the case that the frequency between different mode is more evenly distributed, this binarization can be more efficient.

In some embodiments, the wedge index is signaled in two syntax elements, the angle and the distance (offset) which are defined based on the physical meaning of the wedge mode and can be calculated or predefined in a look up table from the wedge index (or from wedge index to angle/distance). For example, the angle syntax element and the distance syntax element are signaled separately using the multi-symbol adaptive context coding. The context can be the block sizes or the number of similar angle/distances in the neighboring block. As an example, the up to 16 angles, and up to 4 distance is supported, and if angle is larger than or equal to 180 degrees, the angle equals to 0 or 90 degrees, 3 distances are used to avoid overlapping.

Example code 1 below shows example angles and distances for a wedge index lookup table (e.g., used at a decoder component during parsing).

```
static const int wedge_angle_dist_2_index
[WEDGE_ANGLES][NUM_WEDGE_DIST] = {
    {-1, 0, 1, 2},
    {3, 4, 5, 6},
    {7, 8, 9, 10},
    {11, 12, 13, 14},
    {-1, 15, 16, 17},
    {18, 19, 20, 21},
    {22, 23, 24, 25},
    {26, 27, 28, 29},
    {-1, 30, 31, 32},
    {-1, 33, 34, 35},
    {-1, 36, 37, 38},
    {-1, 39, 40, 41},
    {-1, 42, 43, 44},
    {-1, 25, 46, 47},
    {-1, 48, 49, 50},
    {-1, 51, 52, 53},
};
```

Example Code 1—Wedge Index Lookup

In some embodiments, the wedge direction (0 or 1) is signaled first, then an angle value (0-9) is signaled, then depending on whether wedge direction is 0 or 1, different number of distance values are signaled. For example, when angle direction is equal to 0, one of 4 distance values is signaled, and when angle direction is equal to 1, one of 3 distance values is signaled.

In some embodiments, the wedge index is signaled in three syntax elements, the angle direction, the angle, and the distance. For example, the angle direction syntax element indicates to which group of the current angle belongs.

Lookup tables and functions can be used to derive angles/ distances from index or derive index from angle/distance. As an example, the value of angle direction indicates that the current angle is smaller 180 degree or larger than, or equal to, 180 degrees. As another example, the wedge sign syntax element that indicates which part of the wedge split is from P0, can be context coded. For example, the context of the wedge sign is dependent on the signaled angles of the wedge mode.

In some embodiments, the wedge index is signaled in two syntax elements, the wedge group index and wedge index within the group. For example, these two syntaxes are signaled with multi-symbol adaptive context coding.

In some embodiments, the supported wedge modes are divided into multiple groups with predefined rules. The predefined rules may be same for all the video sequences, or signaled at sequence level, frame level, tile level, slice level, or super block level.

In some embodiments, the supported wedge modes are divided into multiple groups based on the coded/decoded side information, including but not limited to the wedge mode index or the reconstructed sample values of the coded blocks in the current sequence, frame, slice, tile, super block row, and/or super block.

As an example, the supported wedge modes are divided into multiple groups based on the wedge mode information of the coded blocks, and the supported wedge modes for the current block are divided into multiple groups based on the statistics/distribution of the wedge modes of the coded blocks in the current sequence, frame, slice, tile, super block row, and/or super block.

Figure 6B:
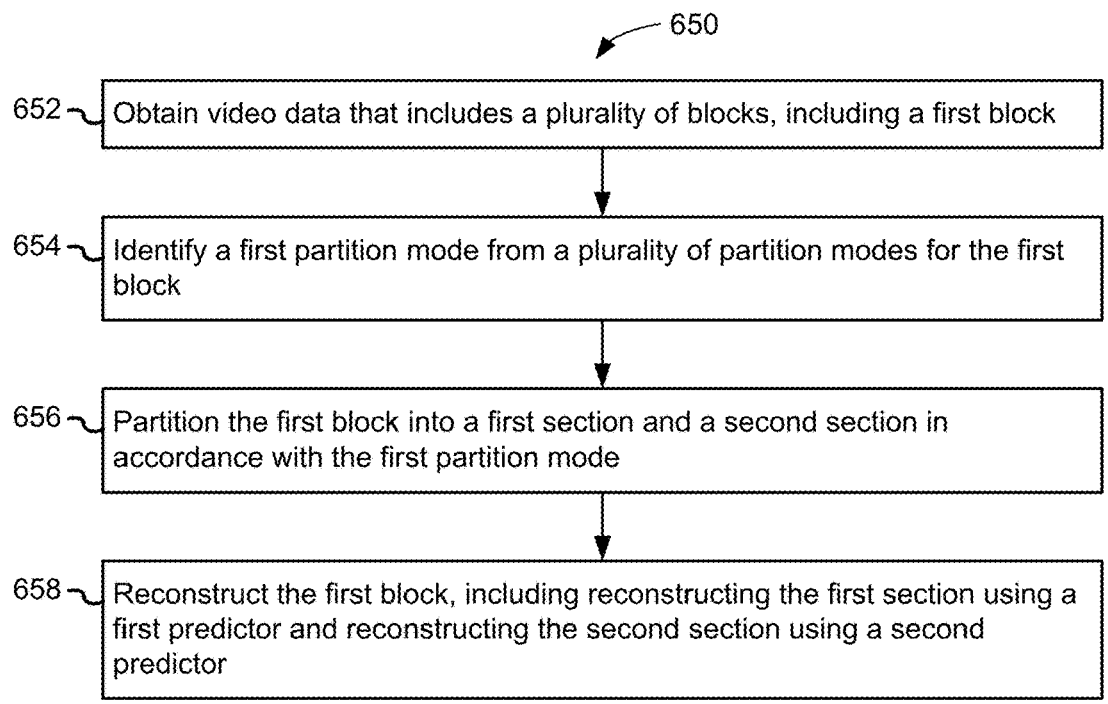
FIG. 6B is a flow diagram illustrating an example method of decoding video in accordance with some embodiments.

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system obtains (652) video data that includes a plurality of blocks, including a first block. In some embodiments, obtaining the video data includes receiving video data comprising a plurality of blocks, including a first block. In some embodiments, the system obtains, from the video data, a syntax element value indicating a wedge mode index corresponding to a first partition mode from a plurality of partition modes for the first block, where the wedge mode index is greater than 16. The system identifies (654) a first partition mode from a plurality of partition modes for the first block. In some embodiments, the system determines that the first partition mode is associated with a compound wedge-based prediction for the first block. The system partitions (656) the first block into a first section and a second section in accordance with the first partition mode (and optionally in accordance with the wedge mode index). In some embodiments, the system decodes the first section in accordance with a first predictor and decoding the second section in accordance with a second predictor. The system reconstructs (658) the first block, including reconstructing the first section using a first predictor and reconstructing the second section using a second predictor. In some embodiments, the method 650 includes components, systems, and/ or processes described above with respect to FIG. 6A.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

Turning now to some example embodiments.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). The method includes: (i) obtaining video data comprising a plurality of blocks, including a first block; (ii) identifying a first partition mode from a plurality of partition modes for the first block; (iii) partitioning the first block into a first section and a second section in accordance with the first partition mode; (iv) encoding the first section in accordance with a first predictor and encoding the second section in accordance with a second predictor; and (v) signaling the first partition mode. In some embodiments, the number of partition modes is greater than 16. For example, the number of partition modes is 68. In some embodiments, the plurality of partition modes comprise a plurality of wedge partitions.

(A2) In some embodiments of A1, the method includes indexing the plurality of partition modes to produce a partition mode index, where signaling the first partition mode comprises signaling the partition mode index.

(A3) In some embodiments of A1 or A2, the partition mode index is signaled using a binary codeword. In some embodiments, signaling the first partition mode incudes signaling the first partition mode using a binary codeword.

(A4) In some embodiments of any of A1-A3, the partition mode index is binarized using Exp-Golomb code. In some cases where the frequency between different mode is more evenly distributed, using Exp-Golomb code is more efficient than binary code. In some embodiments, the first partition mode is binarized using Exp-Golomb code.

(A5) In some embodiments of any of A1-A3, the partition mode index is binarized using a truncated binary code. In some embodiments, the first partition mode is binarized using truncated binary code.

(A6) In some embodiments of A5, binarizing the partition mode index includes assigning respective bins to the plurality of partition modes, including assigning more bins to low frequency modes of the plurality of partition modes as compared to high frequency modes of the plurality of partition modes. In some embodiments, the frequency of the partition modes is predefined or derived based on the decoder (or coded) side information.

(A7) In some embodiments of A6, the respective bins are coded with adaptive context-based coding. In some embodiments, the respective bins are coded with context bypass coding.

(A8) In some embodiments of any of A1-A7, the first partition mode includes a partition line, and the partition line is signaled using a first syntax element for an angle of the partition line and a second syntax element for an offset of the partition line. For example, up to 16 angles, and up to 4 offsets may be supported. In this example, if the angle is larger than, or equal to, 180 degrees, the angle equals to 0 or 90 degrees, and 3 distances are used to avoid overlapping.

(A9) In some embodiments of A8, the angle and the offset are predefined in a lookup table. For example, the angle and the offset (also sometimes called distance) are predefined in a lookup table from the partition index. In some embodiments, the angle and the offset are calculated. In some embodiments, the angle and the offset are defined based on the physical meaning of the partition mode.

(A10) In some embodiments of A8 or A9, the first syntax element and the second syntax element are signaled separately using multi-symbol adaptive context coding. For example, the context may include block size, a number of similar angles in one or more neighboring blocks, and/or a number of similar offsets in one or more neighboring blocks.

(A11) In some embodiments of any of A8-A10, the method further includes signaling a partition line direction for the partition line. For example, the partition line direction is an angle direction. In some embodiments, the partition line direction is signaled prior to signaling the angle. In some embodiments, the partition line direction syntax element indicates the group the current angle belongs to. In some embodiments, similar lookup tables and functions are used to derive angles/offsets from the index and/or derive the index from the angle/offset. In some embodiments, a value of the partition line direction indicates whether the angle is smaller than 180 degrees or larger than (and/or equal to) 180 degrees.

(A12) In some embodiments of A11, a first number of offset values are signaled in accordance with the partition line direction having a first direction and a second number of offset values are signaled in accordance with the partition line direction having a second direction, wherein the second number of offset values is different than the first number of offset values. For example, if the partition line direction is equal to 0, one of 4 distance values are signaled, and if the partition line direction is equal to 1, one of 3 distance values are signaled.

(A13) In some embodiments of any of A1-A12, signaling the first partition mode includes signaling the first predictor for encoding the first section. In some embodiments, signaling the first predictor comprises signaling a reference block for the first section. In some embodiments, signaling the first predictor comprises using a partition sign syntax element to indicate which part of the partition split (e.g., the first section or the second section) is from P0. In some embodiments, the partition sign syntax element is context coded, e.g., with the context of the partition sign depending on the signaled angles of the partition mode.

(A14) In some embodiments of any of A1-A13, the first partition mode is signaled using a first syntax element for a partition group of the plurality of partition modes and a second syntax element for an index with the partition group. In some embodiments, the first and second syntax elements are signaled using multi-symbol adaptive context coding.

(A15) In some embodiments of A14, the plurality of partition modes are split into a plurality of partition groups in accordance with one or more predefined rules. For example, the one or more predefined rules are the same for all of the video sequences. As another example, the one or more predefined rules are signaled at a sequence level, a frame level, a tile level, a slice level, or a super block level. In some embodiments, the group is selected based on a syntax element. In some embodiments, the group is selected based on context information.

(A16) In some embodiments of A14 or A15, the plurality of partition modes are split into a plurality of partition groups in accordance with previously decoded information. For example, the previously decoded information may include the partition mode index and/or reconstructed sample values of the coded blocks in the current sequence, frame, slice, tile, super block, and/or super block row. As another example, the supported partition modes are divided into multiple groups based on the partition mode information of the coded blocks, and the supported partition modes for the current block are divided into multiple groups based on the statistics and/or distribution of the partition modes of the coded blocks in current sequence, frame, slice, tile, super block, and/or super block row. In some embodiments, each group of the multiple groups has a respective predictor indicator.

(B1) In another aspect, some embodiments include a method of video decoding (e.g., the method 650). In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254). The method includes: (i) obtaining video data comprising a plurality of blocks, including a first block, from a bitstream; (ii) identifying a first partition mode from a plurality of partition modes for the first block; (iii) partitioning the first block into a first section and a second section in accordance with the first partition mode; and (iv) reconstructing the first block, including reconstructing the first section using a first predictor and reconstructing the second section using a second predictor.

(B2) In accordance with some embodiments, a method includes one or more of: (i) receiving video data comprising a plurality of blocks, including a first block; (ii) obtaining, from the video data, a syntax element value indicating a wedge mode index corresponding to a first partition mode from a plurality of partition modes for the first block, where the wedge mode index is greater than 16; (iii) determining that the first partition mode is associated with a compound wedge-based prediction for the first block; (iv) partitioning the first block into a first section and a second section in accordance with the first partition mode and the wedge mode index; and (v) decoding the first section in accordance with a first predictor and decoding the second section in accordance with a second predictor.

(B3) In some embodiments of B1 or B2, the wedge mode index is equal to 68.

(B4) In some embodiments of any of B1-B3, the method further includes reconstructing the first block, including reconstructing the first section using the first predictor and reconstructing the second section using the second predictor.

(B5) In some embodiments of any of B1-B4, the wedge mode index is signaled using a binary codeword.

(B6) In some embodiments of any of B1-B5, the wedge mode index mode index is binarized using a truncated binary code.

(B7) In some embodiments of any of B1-B6, the first partition mode includes a partition line, and the partition line is signaled using a first syntax element for an angle of the partition line and a second syntax element for an offset of the partition line.

(B8) In some embodiments of B7, the angle and the offset are predefined in a lookup table.

(B9) In some embodiments of B7 or B8, the first syntax element and the second syntax element are signaled separately using multi-symbol adaptive context coding.

(B10) In some embodiments of any of B7-B9, a partition line direction is signaled for the partition line.

(B11) In some embodiments of B10, a first number of offset values are signaled in accordance with the partition line direction having a first direction and a second number of offset values are signaled in accordance with the partition line direction having a second direction, where the second number of offset values is different than the first number of offset values.

(B12) In some embodiments of any of B1-B 11, the method further includes obtaining, from the video data, the first predictor for encoding the first section.

(B13) In some embodiments of any of B1-B12, the first partition mode is signaled using a first syntax element for a partition group of the plurality of partition modes and a second syntax element for an index with the partition group.

(B14) In some embodiments of B13, the plurality of partition modes are split into a plurality of partition groups in accordance with one or more predefined rules.

(B15) In some embodiments of B13 or B14, the plurality of partition modes are split into a plurality of partition groups in accordance with previously decoded information.

(B16) In some embodiments of any of B1-B15, the bitstream corresponds to video encoded in accordance with any of A1-A14.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A16 and B1-B16 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A16 and B1-B16 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks, including a first block;
   obtaining, from the video bitstream, a first syntax element indicating a partition group index corresponding to a first partition group from a plurality of wedge partition groups, wherein a plurality of partition modes are split into the plurality of wedge partition groups in accordance with previously decoded information;
   obtaining, from the video bitstream, a second syntax element indicating a first partition mode from the first partition group;
   partitioning the first block into a first section and a second section in accordance with the first partition mode from the first partition group; and
   decoding the first section in accordance with a first predictor and decoding the second section in accordance with a second predictor.

2. The method of claim 1, further comprising obtaining a partition offset corresponding to the first partition mode.

3. The method of claim 2, wherein a partition angle for the first partition mode and the partition offset are predefined in a lookup table.

4. The method of claim 2, wherein the first syntax element, the second syntax element, and a third syntax element indicating the partition offset are signaled separately using multi-symbol adaptive context coding.

5. The method of claim 1, further comprising obtaining, from the video bitstream, the first predictor for encoding the first section.

6. The method of claim 1, wherein a plurality of partition modes are split into the plurality of wedge partition groups in accordance with one or more predefined rules.

7. The method of claim 1, further comprising reconstructing the first block, including reconstructing the first section using the first predictor and reconstructing the second section using the second predictor.

8. A method of video encoding, the method comprising:
   receiving video data comprising a plurality of blocks, including a first block;
   identifying a first partition mode for the first block, wherein a plurality of partition modes are split into a plurality of wedge partition groups in accordance with previously coded information;
   identifying a first partition group, from the plurality of wedge partition groups, of which the first partition mode is a member;

partitioning the first block into a first section and a second section in accordance with the first partition mode;

signaling, in a video bitstream, a first syntax element indicating the first partition group of the plurality of wedge partition groups and a second syntax element indicating the first partition mode from the first partition group; and encoding the first section in accordance with a first predictor and encoding the second section in accordance with a second predictor.

9. The method of claim 8, further comprising identifying a partition offset corresponding to the first partition mode, wherein the first block is partitioned in accordance with the partition offset and the first partition mode.

10. The method of claim 9, further comprising signaling the partition offset in the video bitstream using a third syntax element.

11. The method of claim 8, further comprising signaling at least one of the first predictor and the second predictor in the video bitstream.

12. The method of claim 1, wherein the first syntax element and the second syntax element are signaled using multi-symbol adaptive context coding.

13. The method of claim 1, wherein the first partition mode indicates a partition angle and a partition direction.

14. The method of claim 8, wherein the first syntax element and the second syntax element are signaled using multi-symbol adaptive context coding.

15. The method of claim 8, wherein the first partition mode indicates a partition angle and a partition direction.

16. A method of video media bitstream generation, the method comprising:

generating a video bitstream, including:
identifying a first partition mode for a first block of a plurality of blocks, wherein a plurality of partition modes are split into a plurality of wedge partition groups in accordance with previously coded information;

identifying a first partition group, from the plurality of wedge partition groups, of which the first partition mode is a member;

partitioning the first block into a first section and a second section in accordance with the first partition mode;

generating a first syntax element indicating the first partition group of the plurality of wedge partition groups and a second syntax element indicating the first partition mode from the first partition group; and encoding the first section in accordance with a first predictor and encoding the second section in accordance with a second predictor; and transmitting the video bitstream including the encoded first section, the first syntax element, and the second syntax element.

17. The method of claim 16, wherein the first syntax element and the second syntax element are signaled in the video bitstream using multi-symbol adaptive context coding.

18. The method of claim 16, wherein the first partition mode indicates a partition angle and a partition direction.

19. The method of claim 16, wherein generating the video bitstream further comprises identifying a partition offset corresponding to the first partition mode, wherein the first block is partitioned in accordance with the partition offset and the first partition mode.

* * * * *